United States Patent
Nijim et al.

(10) Patent No.: US 9,148,691 B2
(45) Date of Patent: Sep. 29, 2015

(54) MULTIPLE RECORDING DEVICES CONNECTED IN A HOME NETWORK

(75) Inventors: Yousef Wasef Nijim, Roswell, GA (US); Lisa A. Pickelsimer, Atlanta, GA (US); Anant Patil, Marietta, GA (US); Jay Paul Langa, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 448 days.

(21) Appl. No.: 13/094,019

(22) Filed: Apr. 26, 2011

(65) Prior Publication Data

US 2012/0278846 A1 Nov. 1, 2012

(51) Int. Cl.
*H04N 21/433* (2011.01)
*H04N 21/436* (2011.01)
*H04N 21/442* (2011.01)

(52) U.S. Cl.
CPC ..... *H04N 21/4334* (2013.01); *H04N 21/43622* (2013.01); *H04N 21/44227* (2013.01)

(58) Field of Classification Search
None
See application file for complete search history.

(56) References Cited

U.S. PATENT DOCUMENTS

| | | | |
|---|---|---|---|
| 8,831,409 B1* | 9/2014 | Chang et al. | 386/295 |
| 2004/0117440 A1* | 6/2004 | Singer et al. | 709/203 |
| 2006/0136502 A1* | 6/2006 | Williams et al. | 707/200 |
| 2007/0136384 A1* | 6/2007 | Hepper et al. | 707/200 |
| 2008/0040403 A1* | 2/2008 | Hayashi | 707/204 |
| 2008/0040472 A1* | 2/2008 | Kato et al. | 709/224 |
| 2011/0162009 A1* | 6/2011 | Adimatyam et al. | 725/40 |

* cited by examiner

*Primary Examiner* — Mark D Featherstone
(74) *Attorney, Agent, or Firm* — Merchant & Gould P.C.

(57) ABSTRACT

Multiple device recording may be provided. First, a recording device may be added to a network. Next, in response to adding the recording device to the network, recording device attribute data and recording device metadata may be received from the recording device. The received recording device metadata may then be translated. Then, using the translated metadata, asset data corresponding to assets on the recording device may be displayed. The asset data may be displayed in such a way to indicate which assets on the recording device are supported and which assets on the recording device are not supported.

12 Claims, 3 Drawing Sheets

US 9,148,691 B2

MULTIPLE RECORDING DEVICES CONNECTED IN A HOME NETWORK

BACKGROUND

Cable television is a system of providing television to consumers via signals transmitted to a television set through fixed optical fibers or coaxial cables. A set-top box (STB) may be used to convert the cable television signals to ones usable by the television set. A digital video recorder (DVR) may be used in conjunction with a STB. The DVR may record video in a digital format to a disk drive, USB flash drive, memory card, or other memory medium within the DVR.

SUMMARY

Multiple device recording may be provided. First, a recording device may be added to a network. Next, in response to adding the recording device to the network, recording device attribute data and recording device metadata may be received from the recording device. The received recording device metadata may then be translated. Then, using the translated metadata, asset data corresponding to assets on the recording device may be displayed. The asset data may be displayed in such a way to indicate which assets on the recording device are supported and which assets on the recording device are not supported.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
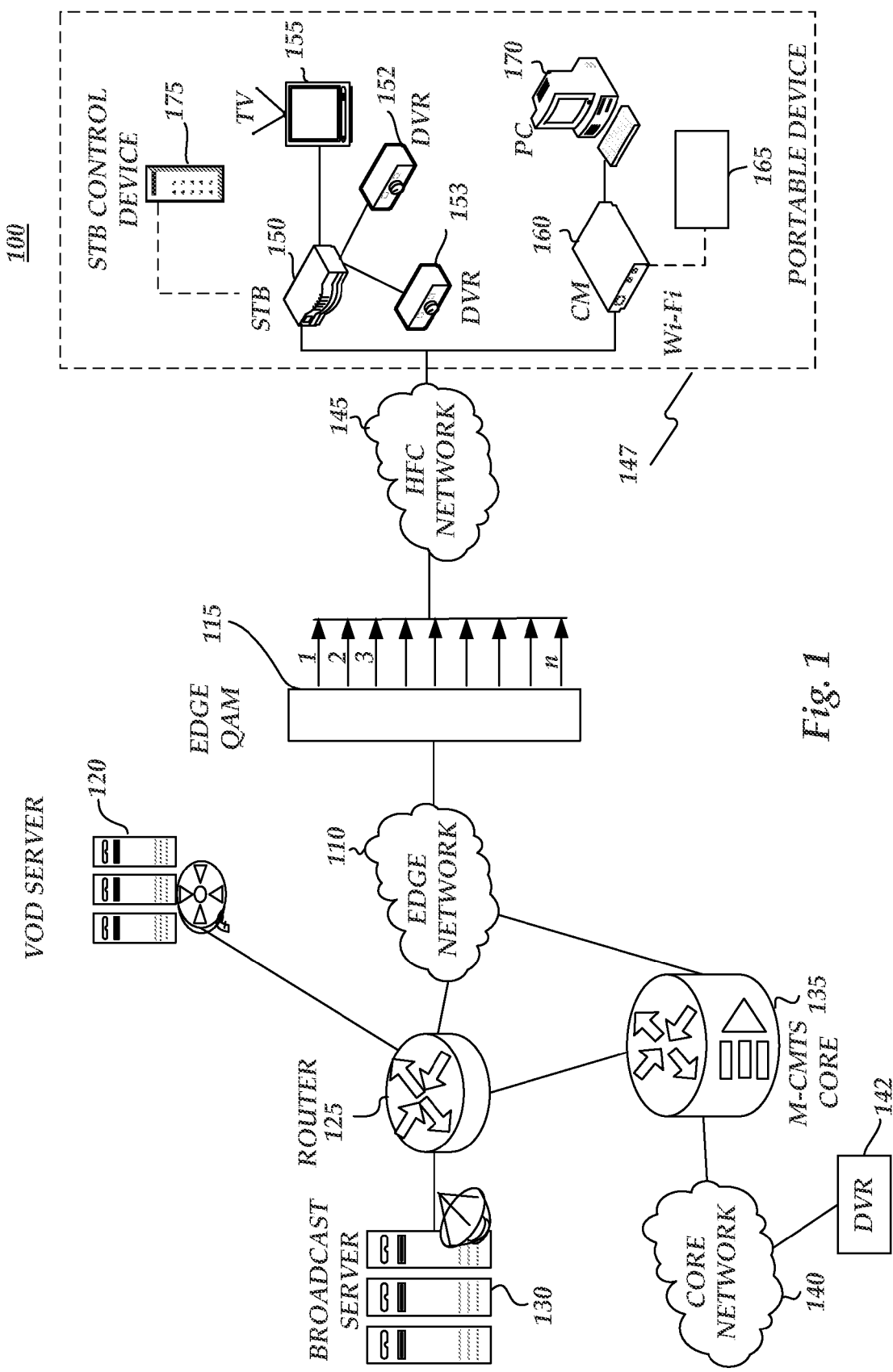
FIG. 1 is a block diagram of an operating environment including a content delivery system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the invention may provide personalized access to recording devices within a network located within a household or recording devices that are based remotely on the Internet Cloud, for example. Embodiments of the invention may allow users to record on multiple DVRs using one list on a media guide. For example, users may request a recording that could be fulfilled on any DVR connected to the network or extended to other approved recording devices. Additionally, embodiments of the invention may allow the user to search content on all recording devices or any chosen devices that are connected to the network.

Consistent with embodiments of the invention, a user may record from more than one recording device (e.g. DVRs) and combine scheduled recordings, recorded programs, and missed recordings on one list (e.g. a combined list from multiple DVRs or other recording devices). Moreover, access to different lists on the recording devices may be personalized. For example, a master user may authorize which users are able to access different recording devices. In other words, embodiments of the invention may allow or restrict the access of multiple users to any recording device within a network, for example, within a home or within any environment.

Furthermore, embodiments of the invention may allow for device management capabilities. For example, the master user may add or remove recording devices from the network from a settings menu. Or a customer service representative (CSR) may be able to add or remove recording devices from the network from a head end of a content deliver system.

FIG. 1 is a block diagram of an example content delivery system 100. Consistent with embodiments of the present invention, system 100 may comprise an edge network 110, an edge quadrature amplitude modulation (QAM) device 115, a video-on-demand (VOD) server 120, a router 125, a broadcast server 130, a modular cable modem termination system (M-CMTS) core 135, a core network 140 (e.g. the internet), and a remote DVR 142. In addition, system 100 may comprise a hybrid fiber-coax (HFC) network 145 and a local (e.g. home) network 147. Local network 147 may include a set-top-box (STB) 150, a first local digital video recorder (DVR) 152, a second local DVR 153, a television (TV) 155, a cable modem (CM) 160, a portable device 165, a personal computer (PC) 170, and a STB control device 175.

Edge network 110 may comprise, a network providing, for example, full-duplex, two-way broadband services including broadband video and audio, cable television services, or telecommunications services. Edge network 110 may provide data by utilizing network data formats including, for example, i) Internet Protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over Internet Protocol and moving pictures expert group (MPEG) transport simultaneously. Edge QAM 115 may provide various data switching functions and enable two-way, full-duplex communication within the broadband network. Edge QAM 115 may modulate and distribute multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on-demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet Protocol (IP) encapsulation may be removed. The MPEG packets may be forwarded down one QAM channel on edge QAM 115 and onto the HFC network 145.

Broadcast server 130 may perform processes for providing broadcast services. Broadcast server 130 may use a broadcast signal and a narrowcast signal to deliver broadcast services to a broadcast system. Broadcast server 130 may receive live or stored video, audio, and/or data from, for example, i) fiber optic input, ii) wireless input, iii) recorded tape, iv) recorded digital video disc, or v) satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multi-media service; iii) the digital television multimedia service; iv) the analog multimedia service; v) the VOD service; vi) the streaming video service; vii) the multimedia messaging service; viii) the Voice over Internet Protocol (VoIP) service; ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS channel bonding. M-CMTS core 135 may support DOCSIS features and end-to-end IP within a Next Generation Network Architecture (NGNA), for example.

Core network 140 may comprise any data or broadband network that may provide data and services to edge network 110, router 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

Recording devices such as remote DVR 142, first local DVR 152, and second local DVR 153 may be used in conjunction with STB 150. Remote DVR 142, first local DVR 152, or second local DVR 153, for example, may record video received (e.g. assets) from system 100 in a digital format to a disk drive, USB flash drive, memory card, or other memory medium within first local DVR 152 or second local DVR 153. STB 150 may include all the functionality provided by a digital video recorder, such as first local DVR 152 or second local DVR 153, in one component and attach to TV 155, for example. In addition, other recording devices (e.g. STB 150, TV 155, CM 160, PC 170, or portable device 165) may record video received (e.g. assets) from system 100 in a digital format to a disk drive, USB flash drive, memory card, or other memory medium within the other recording devices. Assets may comprise, but not limited to, linear television programs (e.g. from broadcast server 130) or on-demand programming (e.g. from VOD server 120).

TV 155 may comprise an end user device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise, for example, any personal computer, network switch, wireless switch, network hub, server, personal digital assistant, mobile telephone, mobile device, notebook computer, tablet computing device, and home computing device. Portable device 165 or PC 170 may serve as user devices for data access from system 100. Portable device 165 and PC 170 may transmit and receive data and services from system 100. Portable device 165 or PC 170 may record video in a digital format to a disk drive, USB flash drive, memory card, or other memory medium within or attached to portable device 165 or PC 170.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing multiple device recording. The system may comprise memory storage and a processing unit coupled to the memory storage. The processing unit may be operative to add a recording device to a network and to receive, in response to adding the recording device to the network, recording device attribute data and recording device metadata from the recording device. In addition, the processing unit may be operative to translate the received recording device metadata and display, using the translated metadata, asset data corresponding to assets on the recording device. The asset data may be displayed in such a way to indicate which assets on the recording device are supported and which assets on the recording device are not supported.

Figure 2:
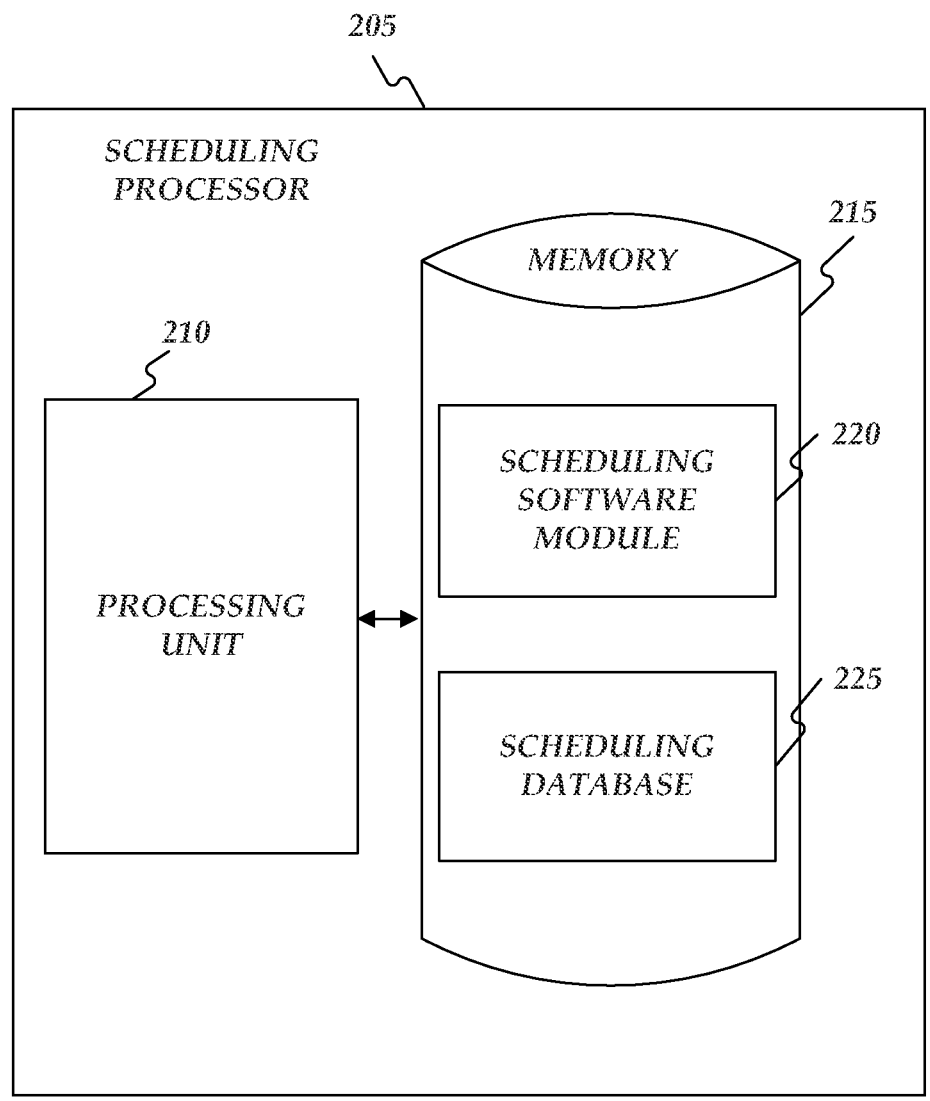
FIG. 2 is a block diagram of the scheduling processor.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, and other components. By way of example, the memory, processing unit, and other components may be implemented with a scheduling processor 205 (as shown in FIG. 2) that may be implemented within, but not limited to, STB 150, first local DVR 152, second local DVR 153, TV 155, CM 160, PC 170, or portable device 165, in combination with system 100. The aforementioned system and processors are examples and other systems and processors may comprise the aforementioned memory, processing unit, and other components, consistent with embodiments of the present invention.

FIG. 2 shows scheduling processor 205. As shown in FIG. 2, scheduling processor 205 may include a processing unit 210 and a memory unit 215. Memory 215 may include a scheduling software module 220 and a scheduling database 225. While executing on processing unit 210, scheduling software module 220 may perform processes for providing multiple device recording, in conjunction with, for example, one or more stages included in method 300 described below with respect to FIG. 3. Furthermore, scheduling software module 220 and scheduling database 225 may be executed on or reside in any element shown in FIG. 1. Moreover, any one or more of the stages included in method 300 may be performed on any element shown in FIG. 1 including, but not limited to, STB 150, first local DVR 152, second local DVR 153, TV 155, CM 160, PC 170, or portable device 165.

Scheduling processor 205 ("the processor") may be implemented using a STB, a DVR, a CM, a mobile device, a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
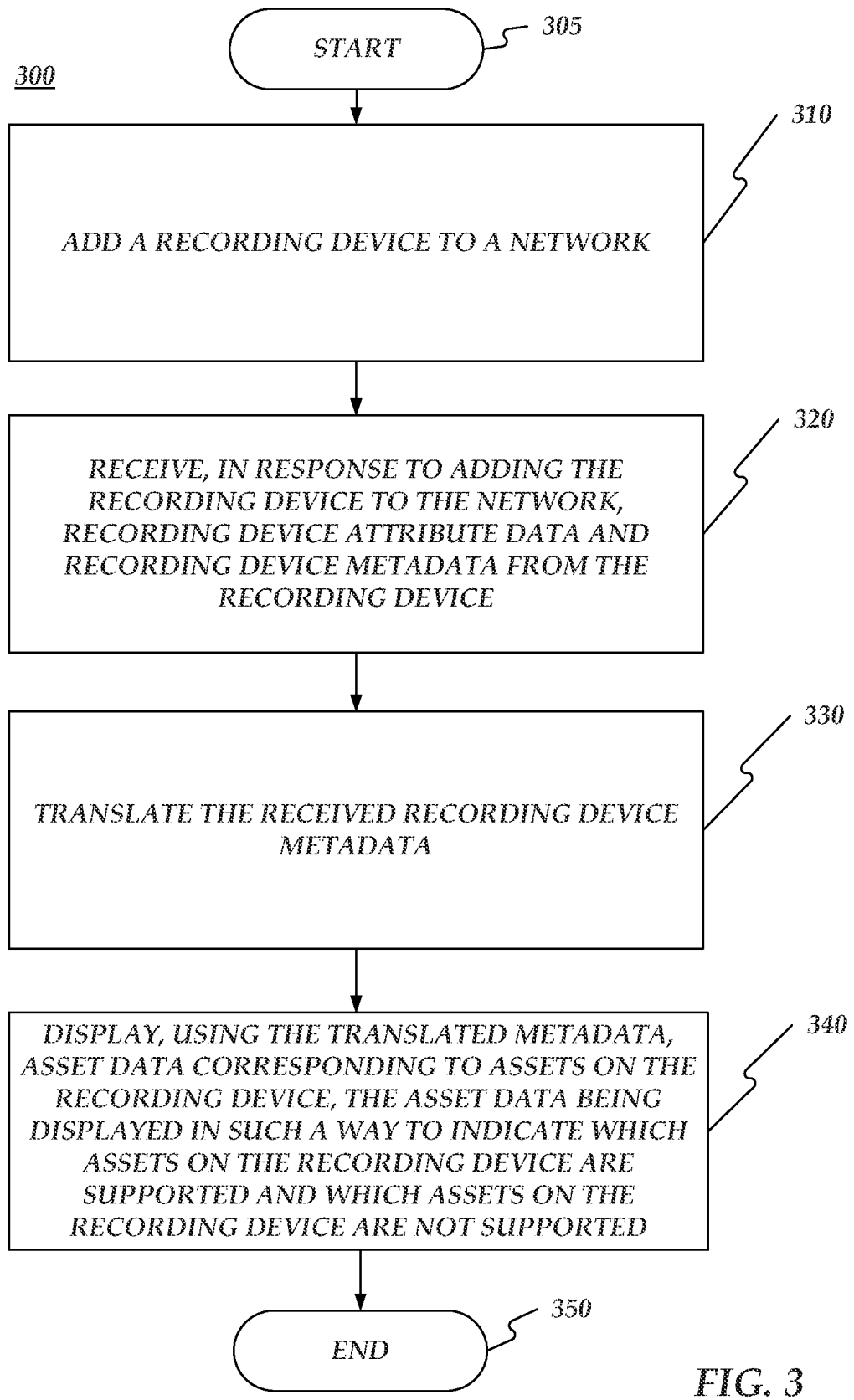
FIG. 3 is a flow chart of a method for providing multiple device recording.

FIG. 3 is a flow chart setting forth the general stages involved in a method 300 consistent with an embodiment of the invention for providing multiple device recording. Method 300 may be implemented using, for example, scheduling processor 205 that may be embodied by, for example, any one or more of STB 150, first local DVR 152, second local DVR 153, TV 155, CM 160, PC 170, portable device 165, or any other element in system 100. Any one or more of the stages included in method 300 may be performed on any one or more of the element shown in FIG. 1 including, but not limited to, STB 150, first local DVR 152, second local DVR 153, TV 155, CM 160, PC 170, or portable device 165. Ways to implement the stages of method 300 will be described in greater detail below.

Method 300 may begin at starting block 305 and proceed to stage 310 where scheduling processor 205 may add a recording device to network 147. For example, scheduling processor 205 may display a media guide on TV 155. A master user may enter a pin number and be given administrative control to add devices into network 147. Consequently, the master user may be given the ability to have more than one recording device in network 147 and utilize the resources in each recording device on network 147 as if all the recording devices on network 147 were a single recording system. Resources included in each recording device may comprise, but is not limited to, storage media (e.g. hard disk drive) space, tuners, assets already stored on the recording device, and the types of assets the recording device is entitled to record (e.g. on demand content, linear content, etc.)

Consistent with embodiments of the invention, scheduling processor 205 may detect a recording device that is not in network 147. For example, the user may have just connected DVR 152 to network 147. In response to detecting DVR 152, scheduling processor 205 may display, through the media guide on TV 155, data identifying the detected recording device (e.g. DVR 152). In response, scheduling processor 205 may receive a user initiated input to add the detected recording device to network 147. For example, the user may user STB control device 175 to send the user initiated input to scheduling processor 205. In response to receiving the user initiated input to add DVR 152 (e.g. the detected recording device) to network 147, scheduling processor 205 may append DVR 152 to network 147. Accordingly, network 147 may utilize the resources of DVR 152, along with the resources in each recording device on network 147, as if all the recording devices on network 147 were a single recording system.

From stage 310, where scheduling processor 205 adds the recording device to network 147, method 300 may advance to stage 320 where scheduling processor 205 may receive, in response to adding the recording device to network 147, recording device attribute data and recording device metadata from the recording device. For example, the recording device attribute data may comprise, but is not limited to, trick play speeds used by DVR 152, compression format used by DVR 152, or recording format used by DVR 152. The recording device metadata may comprise, but is not limited to, the titles of assets stored on DVR 152 or poster art for assets stored on DVR 152.

Once scheduling processor 205 receives the recording device attribute data and the recording device metadata in stage 320, method 300 may continue to stage 330 where scheduling processor 205 may translate the received recording device metadata. Translating the received metadata may comprise mapping the received metadata from DVR 152 to a local metadata format supported by scheduling processor 205. For example, the location of asset titles may be different in the local metadata format supported by scheduling processor 205 as compared to the received metadata from DVR 152. Consequently, scheduling processor 205 may map the received metadata from DVR 152 to the local metadata format. Moreover, scheduling processor 205 may determine, based upon the received attribute data, which assets from DVR 152 are supported by scheduling processor 205 and trick play speeds for DVR 152.

After scheduling processor 205 translates the received recording device metadata in stage 330, method 300 may proceed to stage 340 where scheduling processor 205 may display on TV 155 through the media guide, using the translated metadata, asset data corresponding to assets on DVR 152. The displayed asset data may comprise titles of assets stored on DVR 152. The asset data may be displayed in such a way to indicate which assets on DVR 152 are supported by scheduling processor 205 and which assets on DVR 152 are not supported by scheduling processor 205. For example, due to an incompatible compression format or an incompatible recording format, scheduling processor 205 may not be able to play certain assets from DVR 152 on TV 155. Consequently, when a title of an incompatible asset is displayed on TV 155, the displayed title may be "grayed out". Or if a user selected an incompatible title to play, a message indicating that the asset is incompatible may be displayed. Furthermore, the asset data may be displayed in response to determining that a user has been authorized access to DVR 152. Once scheduling processor 205 displays asset data corresponding to the assets on the recording device in stage 340, method 300 may then end at stage 350.

Consistent with embodiments of the invention, assets may be recorded by recording devices in system 147. For example, scheduling processor 205 may receive a request to record an asset. In response to the request, scheduling processor 205 may select one of the plurality of recording devices on network 147 to record the asset. Scheduling processor 205 may select the one of the plurality of recording devices based upon determining that the selected one of the plurality of recording devices is entitled to record the asset. For example, the asset to be recorded may be an on demand asset and DVR 142 and DVR 153 may be the only recording devices usable by scheduling processor 205 that can record on demand programming. Furthermore, DVR 142 may not have a tuner available at the time. Consequently, scheduling processor 205 may select and use DVR 153 to record the asset.

Furthermore, consistent with other embodiments of the invention, assets may be recorded by recording devices in system 147. For example, scheduling processor 205 may receive a request to record a first asset. The received request may indicate a recording device (e.g. portable device 165) on network 147 that the user sending the request wants to use to perform the recording. However, scheduling processor 205 may determine that the indicated recording device is not entitled to record the first asset. For example, the first asset may be an on demand asset and portable device 165 may not be able to get on demand content or may be busy. In response, scheduling processor 205 may suggest to the user a second asset to record that the recording device is entitled to record. The second asset may comprise the same or related program, but may be available to the portable device 165 over, for example, the internet rather than on demand.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing multiple device recording, the method comprising:

adding a first recording device to a network;

receiving, in response to adding the first recording device to the network, recording device attribute data and recording device metadata from the first recording device wherein the recording device attribute data comprises trick play speeds used by the first recording device, a compression format used by the first recording device, and recording format used by the first recording device;

translating the received recording device metadata, wherein translating the received recording device metadata comprises mapping the received recording device metadata to a local metadata format supported by a scheduling processor wherein mapping the received recording device metadata to the local metadata format further comprises;

determining, based upon the received attribute data, which assets from the first recording device are supported by the scheduling processor, determining, based upon the received attribute data, trick play speeds for the first recording device, determining at least one of the assets on the first recording device that is not supported by the scheduling processor based upon the received compression format used by the first recording device and the received recording format used by the first recording device, and providing an indication in the media guide that the at least one of the assets on the first recording device is not supported by the scheduling processor wherein providing the indication in the media guide comprises displaying a grayed out title corresponding to the at least one of the assets on the first recording device is not supported by the scheduling processor; and displaying in the media guide, using the translated metadata, asset data corresponding to assets on the first recording device with asset data corresponding to assets on at least one second recording device of the network.

2. The method of claim 1, wherein adding the first recording device to the network comprises:

displaying data identifying the first recording device;

receiving, in response to the displayed data identifying the first recording device, user initiated input to add the detected first recording device to the network; and appending, in response to the received user initiated input to add the first recording device to the network, the detected first recording device to the network.

3. The method of claim 1, wherein displaying the asset data comprises displaying the asset data in response to determining that a user has been authorized access to the first recording device.

4. The method of claim 1, further comprising displaying the asset data in such a way to indicate which assets on the first recording device are supported comprises displaying an asset as being supported based upon one of the following: compression format, recording format, resolution supported by the recording device, a user having a rights to the assets on the recording device, and a format supported by the recording device.

5. The method of claim 1, wherein adding the first recording device to the network comprises adding the first recording device to the network contained within a home.

6. The method of claim 1, wherein adding the first recording device to the network comprises adding the first recording device to the network including a plurality of recording devices.

7. The method of claim 1, wherein adding the first recording device to the network comprises adding the first recording device comprising one of the following: a DVR, a personal computer, a television, a gaming console, and a portable device.

8. The method of claim 1, wherein adding the first recording device to the network comprises adding the first recording device comprising a DVR located on a service provider head end.

9. The method of claim 1, wherein adding the first recording device to the network comprises adding the first recording device comprising a DVR located on the internet.

10. The method of claim 2, further comprising detecting the first recording device.

11. The method of claim 3, wherein determining that the user has been authorized access to the first recording device comprises determining that the user has been authorized access from one of the following: a service provider and an owner of rights to at least one asset on the first recording device.

12. A method for providing multiple device recording, the method comprising:

adding a first recording device to a network;

receiving, in response to adding the first recording device to the network, recording device attribute data and recording device metadata from the first recording device wherein the recording device attribute data comprises trick play speeds used by the first recording device, a compression format used by the first recording device, and recording format used by the first recording device;

translating the received recording device metadata, wherein translating the received recording device metadata comprises mapping the received recording device metadata to a local metadata format supported by a scheduling processor wherein mapping the received recording device metadata to the local metadata format further comprises;

determining, based upon the received attribute data, which assets from the first recording device are supported by the scheduling processor, determining at least one of the assets on the first recording device that is not supported by the scheduling processor based upon the received compression format used by the first recording device and the received recording format used by the first recording device, and providing an indication in the media guide that the at least one of the assets on the first recording device is not supported by the scheduling processor wherein providing the indication in the media guide comprises displaying a message, upon selection of the assets on the first recording device that is not supported by the scheduling processor, indicating that the selected at least one of the assets on the first recording device that is not supported by the scheduling processor; and displaying in the media guide, using the translated metadata, asset data corresponding to assets on the first recording device with asset data corresponding to assets on at least one second recording device of the network.

* * * * *